United States Patent
Lee et al.

(10) Patent No.: US 8,339,541 B2
(45) Date of Patent: Dec. 25, 2012

(54) BACKLIGHT UNIT INCLUDING LIGHT EMITTING DIODES AND LIQUID CRYSTAL DISPLAY DEVICE INCLUDING THE SAME

(75) Inventors: Koo-Hwa Lee, Gyeongsangbuk-do (KR); Kyeong-Kun Jang, Gimi-si (KR); Pu-Jin Kim, Gumi-si (KR); Kee-Tae Yoo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 655 days.

(21) Appl. No.: 12/314,700

(22) Filed: Dec. 15, 2008

(65) Prior Publication Data

US 2009/0284682 A1 Nov. 19, 2009

(30) Foreign Application Priority Data

May 13, 2008 (KR) .................. 10-2008-0044061

(51) Int. Cl.
*G02F 1/1335* (2006.01)
*F21V 7/04* (2006.01)
(52) U.S. Cl. ............. 349/68; 349/61; 362/612; 345/102
(58) Field of Classification Search .................. 349/61, 349/68; 362/231, 612; 345/102
See application file for complete search history.

(56) References Cited

U.S. PATENT DOCUMENTS

| 6,508,564 | B1 | 1/2003 | Kuwabara et al. | |
| 2005/0001537 | A1 | 1/2005 | West et al. | |
| 2005/0135094 | A1* | 6/2005 | Lee et al. | 362/231 |
| 2005/0212404 | A1* | 9/2005 | Chen et al. | 313/500 |
| 2007/0274093 | A1* | 11/2007 | Haim et al. | 362/561 |
| 2008/0084520 | A1* | 4/2008 | Nam et al. | 349/65 |
| 2011/0007228 | A1* | 1/2011 | Yoon et al. | 348/790 |

FOREIGN PATENT DOCUMENTS

| KR | 1020030066440 | 8/2003 |
| WO | WO 2007/125623 | 11/2007 |
| WO | WO 2009/048709 A1 | 4/2009 |

OTHER PUBLICATIONS

P. R. Boyce, Human Factors in Lighting, 2003, Taylor & Francis, Inc., pp. 14-16.*
Seoul Semiconductor Co., Ltd.: "1W Z-Power LED series: Binning and Labeling (P4)", Rev 00, Dec. 2006.

* cited by examiner

*Primary Examiner* — Nathanael R Briggs
(74) *Attorney, Agent, or Firm* — McKenna Long & Aldridge LLP

(57) ABSTRACT

A backlight unit for a liquid crystal display device includes a plurality of white LEDs on a PCB, along a length direction of the PCB, and emitting white lights, the plurality of white LEDs including first and second LEDs alternately arranged; and a plurality of optical sheets on a path of the white lights from the plurality of white LEDs to a liquid crystal panel, wherein the white light from the first LED and the white light from the second LED are substantially complementary in color to each other with respect to a target white light.

12 Claims, 9 Drawing Sheets

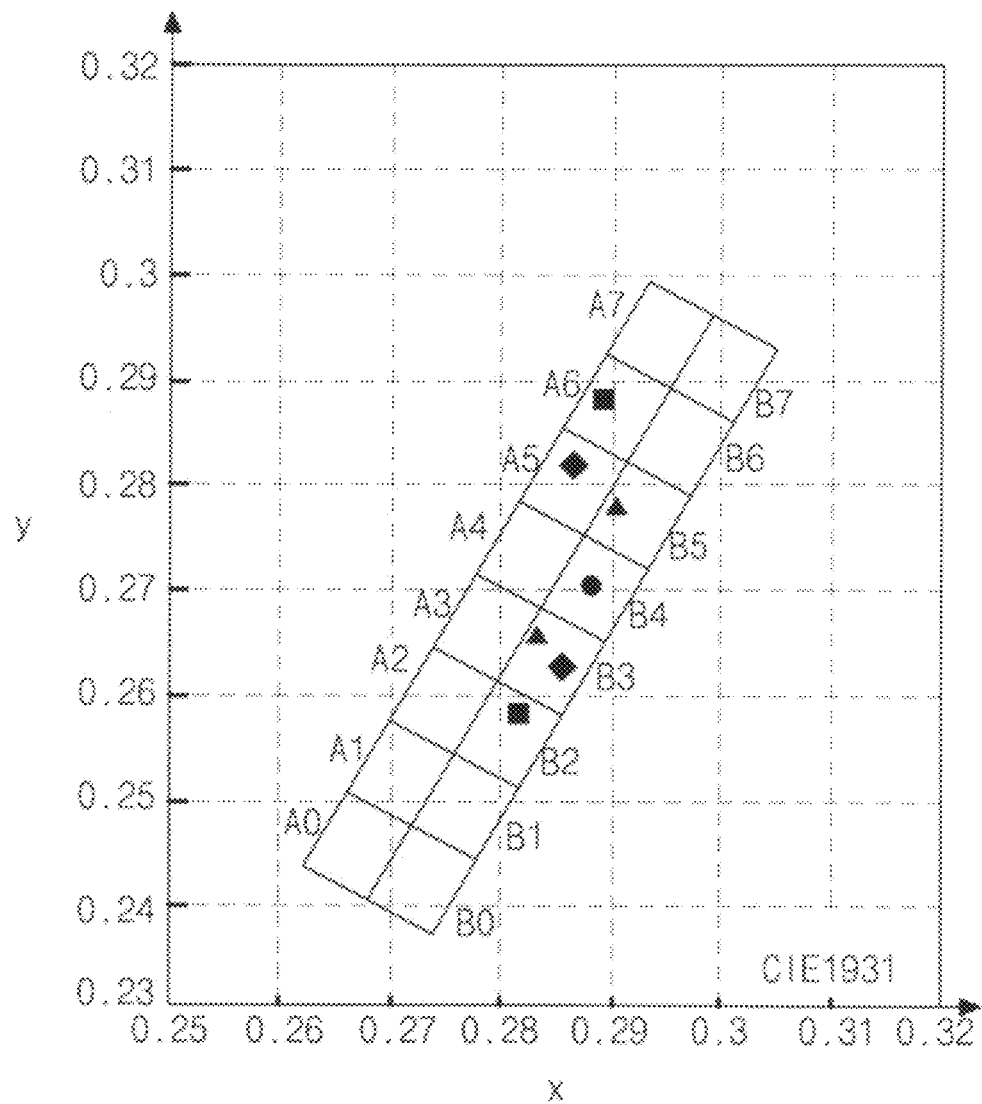

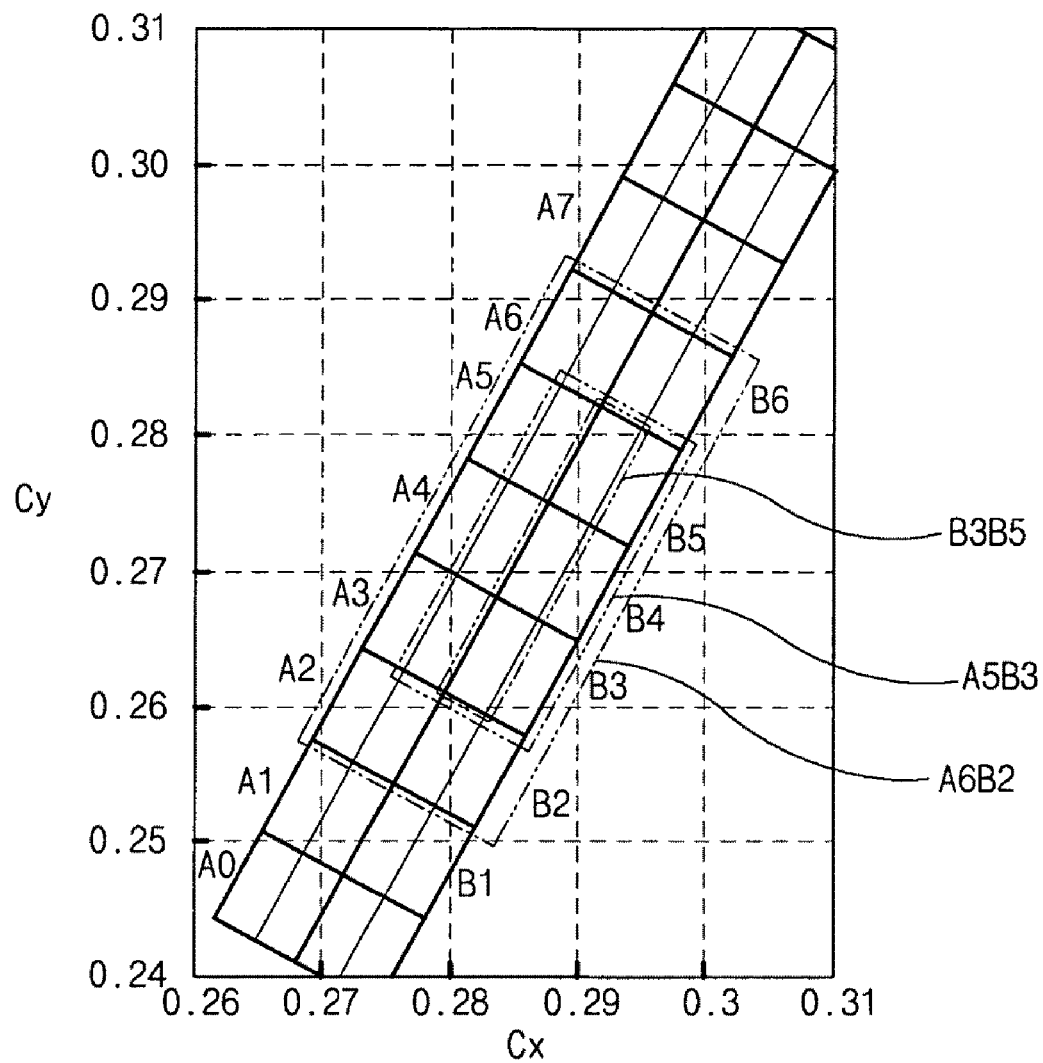

BACKLIGHT UNIT INCLUDING LIGHT EMITTING DIODES AND LIQUID CRYSTAL DISPLAY DEVICE INCLUDING THE SAME

The present invention claims the benefit of Korean Patent Application No. 2008-0044061, filed in Korea on May 13, 2008, which is hereby incorporated by reference for all purposes as if fully set forth herein.

BACKGROUND OF THE INVENTION

1. Field of the Invention

The present invention relates to a liquid crystal display device, and more particularly, a backlight unit using light emitting diodes and a liquid crystal display device using the same.

2. Discussion of the Related Art

Until recently, display devices have typically used cathode-ray tubes (CRTs). Presently, various types of flat panel displays are being researched and developed as a substitute for CRTs such as liquid crystal display (LCD) devices, plasma display panels (PDPs), field emission displays, and electroluminescence displays (ELDs). Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field and the direction of the induced electric field, thereby changing the light transmissivity of the LCD device. Thus, the LCD device displays images by varying the intensity of the induced electric field.

The LCD devices need a backlight unit to supply light. A light source may include a CCFL (cold cathode fluorescent lamp), an EEFL (external electrode fluorescent lamp) and an LED (light emitting diode). Among theses light sources, the LED has many advantages, such as low power consumption, high reliability and compact size.

FIG. 1 is a cross-sectional view illustrating an LCD device according to the related art. Referring to FIG. 1, the LCD device according to the related art includes a liquid crystal panel 10, a backlight unit 20, a main supporter 30, a bottom case 50 and a top case 40. The liquid crystal panel 10 includes first and second substrates 12 and 14 and a liquid crystal layer between the first and second substrates 12 and 14. The backlight unit 20 is below the liquid crystal panel 10. The backlight unit 20 includes a reflector 25 on the bottom case 50, a light guide plate 23 on the reflector 25, an LED assembly 29 along a side of the light guide plate 23, and a plurality of optical sheets 21.

The LED assembly 29 includes a PCB (printed circuit board) 29b and a plurality of white LEDs 29a installed on the PCB. White light emitted from the white LEDs enters the light guide plate 23 at an edge and is refracted in the light guide plate 23 toward the liquid crystal panel 10. The refracted light along with light reflected by the reflector 25 pass through the plurality of optical sheets 21 to produce a high quality plane of light that is supplied to the liquid crystal panel 10.

The liquid crystal panel 10 and the backlight unit 20 are accommodated in the main supporter 30 having a frame shape, and the main supporter 30 is coupled with the top cases 40 to cover peripheral portions of the liquid crystal panel 10, and the bottom case 50 covers the bottom of the backlight unit 20. These components are assembled into the LCD device. First and second polarizing plates 19a and 19b are attached on outer surfaces of the first and second substrates 12 and 14, respectively.

FIG. 2 is the CIE color coordinates illustrating a color distribution of an example of a white LED. In FIG. 2, the CIE color coordinates are referred to as 1931 CIE color coordinates.

The white LED includes a blue LED chip and a yellow phosphor covering the blue LED chip. The yellow phosphor is made of a YAG (Yttrium Aluminum Garnet) group and a TAG (Terbium Aluminum Garnet) group, or a silicate group. Accordingly, the white LED emits white light by mixing a blue light emitted from the blue LED chip and a yellow light emitted from the yellow phosphor. Generally, it is desired that the LEDs are manufactured to have the same color property that is appropriate for the light source of the backlight unit. However, the color properties of the white LEDs, in reality vary due to a difference in the dominant wavelength of the blue LED chip and differences in the content of the yellow phosphor among the white LEDs manufactured. Accordingly, referring to FIG. 2, even though the white LEDs emit white light, the white light emitted from the white LEDs vary in color but have a distribution to some extent in the color space.

The white region shown in FIG. 2 is divided into a plurality of regions. These regions are referred to as bins, and the process of dividing the white LEDs is referred to as a binning. An LCD device manufactured by a manufacturer needs to produce a target white light that is associated with a specific bin, for example, a target bin TB that has an appropriate color property for its own LCD device among the plurality of bins. Accordingly, the LEDs belonging to other bins are not used for the LCD and wasted. Even though the LCD manufacturer uses different bins within a tolerance for error for LCD its devices, white is different between LCD devices due to using the different bins. Accordingly, because only a small number of the white LEDs manufactured is utilized for the LCD device, production efficiency of the white LED is reduced and production cost thus increases. Therefore, production cost of the backlight unit and LCD device increases.

SUMMARY OF THE INVENTION

Accordingly, the present invention is directed to a liquid crystal display device that substantially obviates one or more of the problems due to limitations and disadvantages of the related art.

An advantage of the present invention is to provide a backlight unit including LEDs and an LCD device including the same that can reduce production cost and have uniform property of lights.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a backlight unit for a liquid crystal display device includes a plurality of white LEDs on a PCB, along a length direction of the PCB, and emitting white lights, the plurality of white LEDs including first and second LEDs alternately arranged; and a plurality of optical sheets on a path of the white lights from the plurality of white LEDs to a liquid crystal panel, wherein the white light from the first LED and the white light from the second LED are substantially complementary in color to each other with respect to a target white light.

In another aspect, a liquid crystal display device includes a liquid crystal panel; a plurality of white LEDs on a PCB, along a length direction of the PCB, and emitting white lights, the plurality of white LEDs including first and second LEDs alternately arranged; and a plurality of optical sheets on a path of the white lights from the plurality of white LEDs to the liquid crystal panel, wherein the white light from the first LED and the white light from the second LED are substantially complementary in color to each other with respect to a target white light.

In another aspect, a liquid crystal display device includes a liquid crystal panel; a plurality of LEDs on a PCB, along a length direction of the PCB, and emitting lights, the plurality of LEDs including first and second LEDs alternately arranged to mix the lights from the first and second LEDs; and a plurality of optical sheets on a path of the lights from the plurality of LEDs to the liquid crystal panel, wherein the light from the first LED and the light from the second LED are substantially complementary in an optical property to each other with respect to a target light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 illustrates the color distribution in CIE color coordinates of white light emitted from manufactured white LEDs; and FIG. 10 is the CIE coordinates illustrating the utilization ratios of Table 3.

DETAILED DESCRIPTION OF THE ILLUSTRATED EMBODIMENTS

Reference will now be made in detail to illustrated embodiments of the present invention, which are illustrated in the accompanying drawings.

Figure 1:
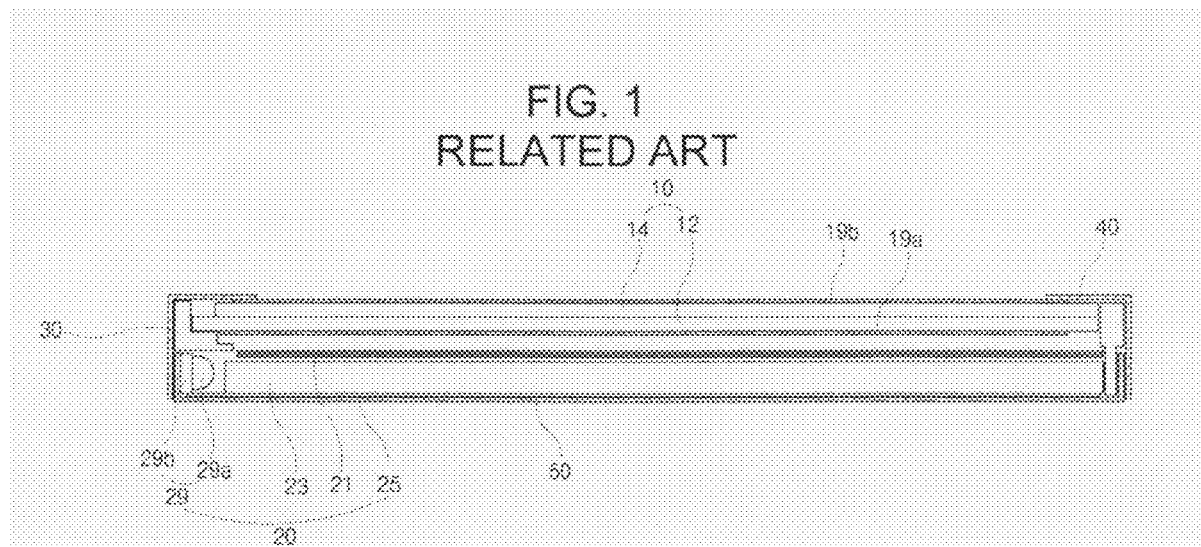
FIG. 1 is a cross-sectional view illustrating an LCD device according to the related art.
Figure 2:
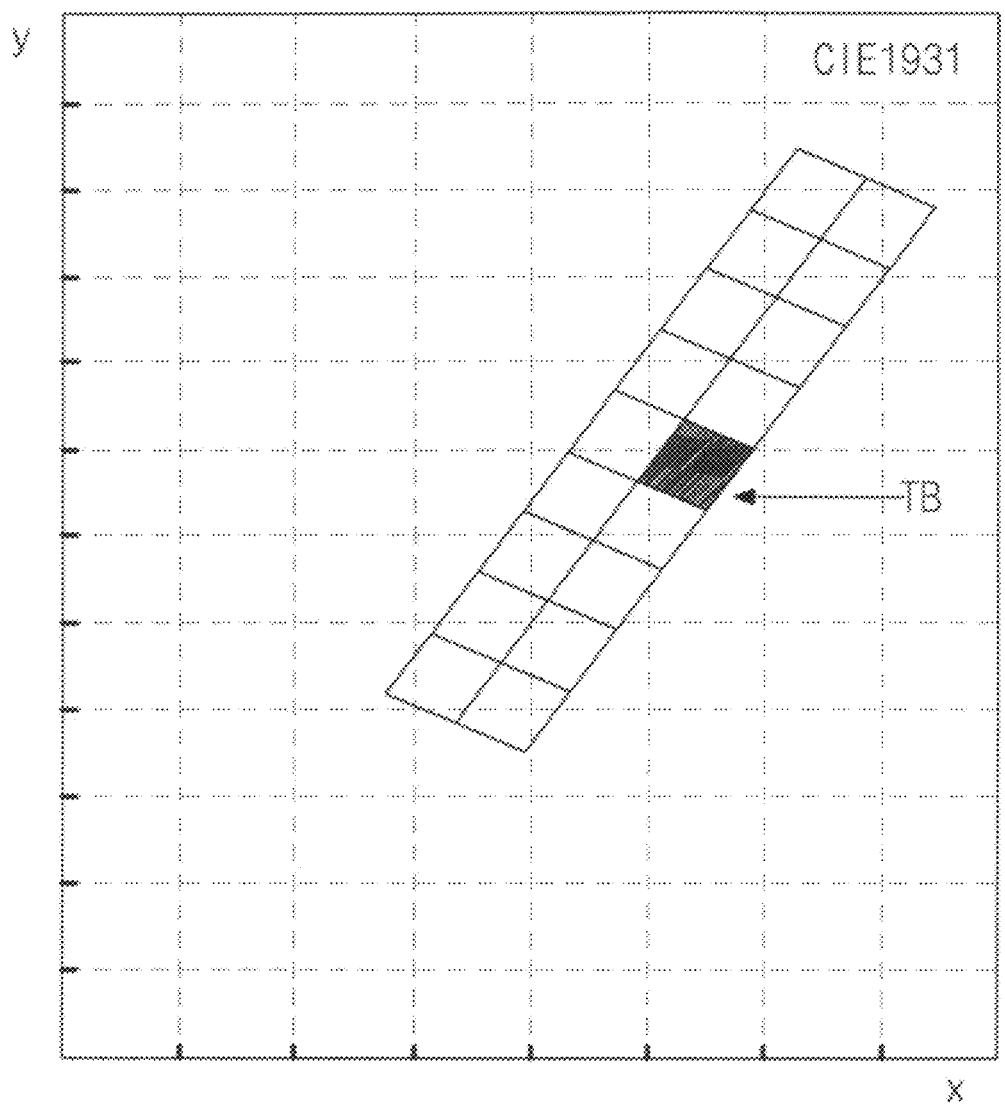
FIG. 2 is the CIE color coordinates illustrating a color distribution of an example of white LEDs.
Figure 3:
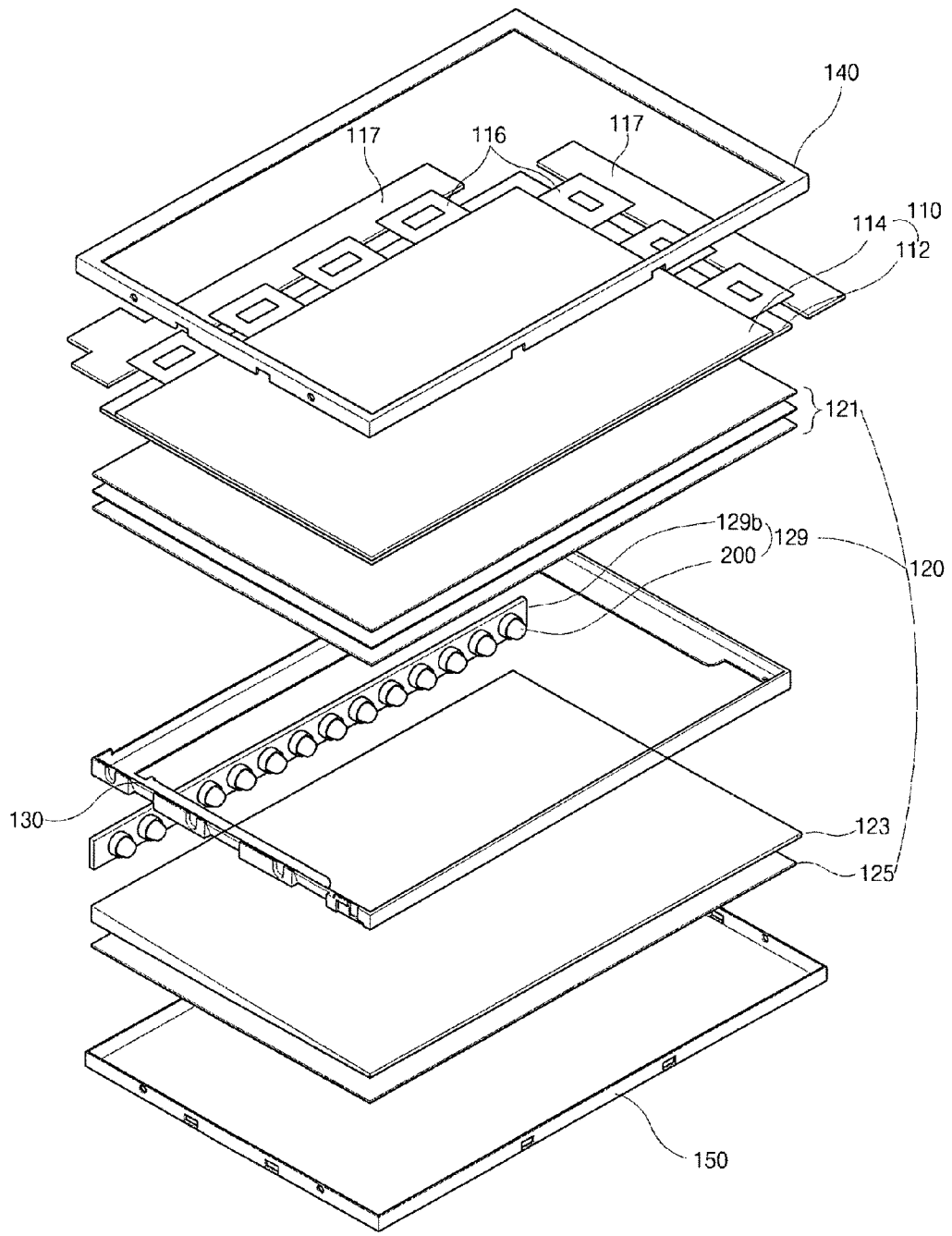
FIG. 3 is a perspective view illustrating an LCD device according to an embodiment of the present invention.

FIG. 3 is a perspective view illustrating an LCD device according to an embodiment of the present invention.

Referring to FIG. 3, the LCD device includes a liquid crystal panel 110, a backlight unit 120, a main supporter 130, a bottom case 150 and a top case 140.

The liquid crystal panel 110 displays images and includes first and second substrates 112 and 114 and a liquid crystal layer between the first and second substrates 112 and 114. Not shown in the drawings on the first substrate 112, a plurality of gate lines and a plurality of data lines cross each other to define a plurality of pixel regions. In each pixel region, a thin film transistor is formed and connected to the corresponding gate and data lines, and a pixel electrode is connected to the thin film transistor. On the second substrate 114, red, green and blue color filter patterns are formed in the respective pixel regions, and a black matrix is formed corresponding to the gate and data lines and the thin film transistor. Further, first and second polarizing plates are attached on outer surfaces of the first and second substrates 112 and 114, respectively.

At least one driving PCB (printed circuit board) 117 may be connected to the liquid crystal panel 110 through a connection portion 116, for example, a flexible circuit board or TCP (tape carrier package). In an assembling process, the connection portion 116 is bent and the PCB 117 is put on a side of the main supporter 130 or a bottom of the bottom case 150.

The backlight unit 120 includes a reflector 125 on the bottom case 150, a light guide plate 123 on the reflector 125, an LED assembly 129 at a side of the light guide plate 123, and a plurality of optical sheets 121 on the light guide plate 123. The LED assembly 129 includes a LED PCB 129b and a plurality of white LEDs 200 installed on the LED PCB 129b.

White light emitted from the white LED is incident on the light guide plate 123, and the white light is distributed evenly as it travels and totally reflects along light guide plate 123. Accordingly, the light guide plate 123 functions to supply an even plane of white light. The light guide plate 123 may have a pattern at a bottom, for example, a prism pattern, to produce a more uniform plane of white light.

The reflector 125 reflects lights back into the light guide plate 123 and increases luminance. The plurality of optical sheets 121 may include a diffusion sheet and at least one condensing sheet. Accordingly, the optical sheets 121 function to diffuse and condense the light passing through the light guide plate 123 and supply a more uniform plane of light to the liquid crystal panel 110.

The main supporter 130 has a rectangular frame shape and is coupled with the top case 140 and the bottom case 150 to accommodate the liquid crystal panel 110 and the backlight unit 120 therein. The top case 140 has a rectangular frame shape and covers peripheral potions of the liquid crystal panel 110. The bottom case 150 covers and supports the backlight unit 120 at the bottom of the LCD device.

The plurality of white LEDs 200 may include first and second white LEDs 200 producing white light that are complementary in color to each other with respect to a desired target white light for the LCD device, and the first and second LEDs 200 may be alternately arranged. Accordingly, even though the white LEDs 200 emitting different white light are utilized in the backlight unit 120, the desired white light is supplied to the liquid crystal panel 110.

Figure 4:
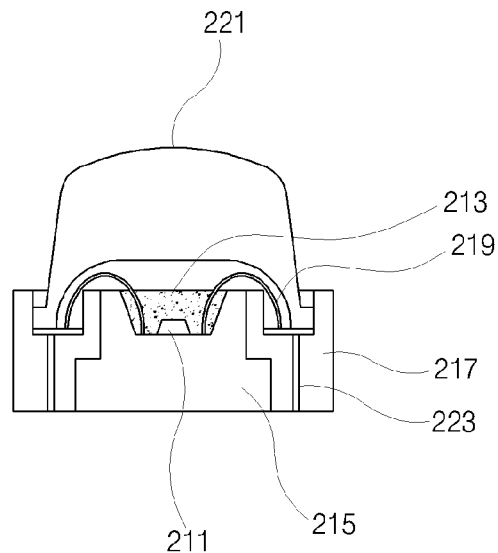
FIG. 4 is a view illustrating an LED of the LCD device according to an embodiment of the present invention.

FIG. 4 is a view illustrating an LED of the LCD device according to the embodiment of the present invention. Referring to FIG. 4, the LED 200 includes a blue LED chip 211, a phosphor 213 and a lens 221. The blue LED chip 211 is placed on a heat slug (???) 215. The heat slug 215 is covered by a case 217 as a housing and filled with the phosphor 213. A pair of cathode and anode leads 223 are installed at the case 217, electrically connected to the blue LED chip 211 through wires 219 and exposed outside the case 217. The cathode and anode leads 223 are electrically connected to a current source supplying a driving current to the blue LED chip 211.

The lens 221 is on the case 217, covers the blue LED chip 211, the phosphor 213, a reflective surface of the heat slug 215 and the wires 219. The lens 221 controls the angle of the light emitted from the white LED 200. The phosphor 213 may be a yellow phosphor, or a green and red mixed phosphor.

The blue LED chip 211 emits a blue light when supplied with the current. The blue light is mixed with a light emitted from the phosphor 213 so that a white light is produced. The white light is emitted through the lens 221.

The white LEDs 200 manufactured by an LED manufacturer emit somewhat different white light. Among the white LEDs 200, first and second LEDs, which have a complementary color property with respect to a target white light are selected and arranged in the backlight unit so that the target white light can be substantially produced by mixing the complementary white lights of the first and second white LEDs.

Figure 5:
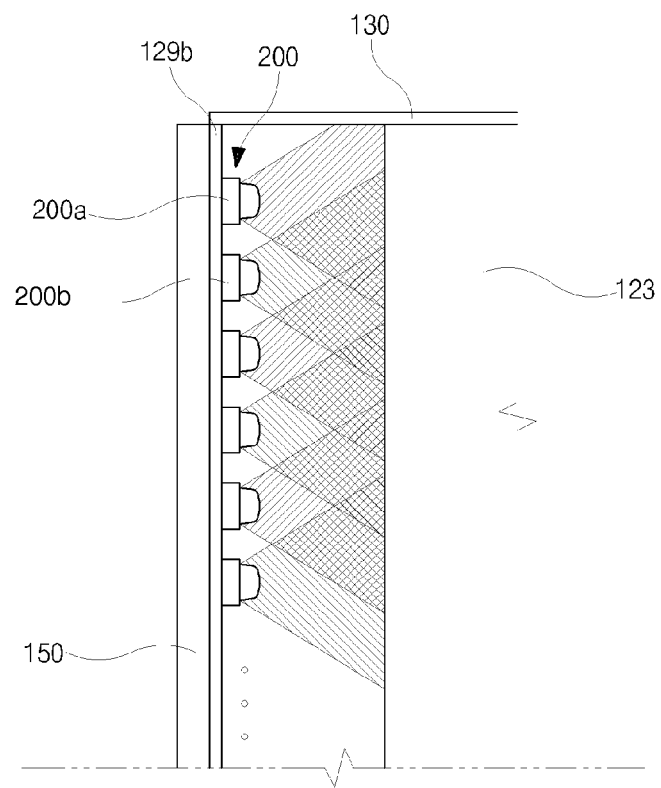
FIG. 5 is a view illustrating an arrangement of first and second white LEDs and mixing of the white light from the first and second white LEDs according to the embodiment of the present invention.

FIG. 5 is a view illustrating an arrangement of first and second white LEDs and the mixing of the white light from the first and second white LEDs according to the embodiment of the present invention.

Referring to FIG. 5, first and second white LEDs 200a and 200b are alternately arranged on a LED PCB 129b. The first and second white LEDs 200a and 200b emit white light complementary to each other with respect to a target white light. The target white light may be a white light having a color property appropriate for the LCD device, for example, a fully white light.

For example, the first white LED 200a emits a white light inclining to red while the second white LED 200b emits a white light inclining to cyan. The reddish white light and the cyanic white light are complementary to each other with respect to the target white light. Accordingly, as the first and second white LEDs 200a and 200b are alternately arranged and emit complementary white light, the complementary white light is uniformly mixed into the white light having substantially the same color property as the target white light.

Figure 6:
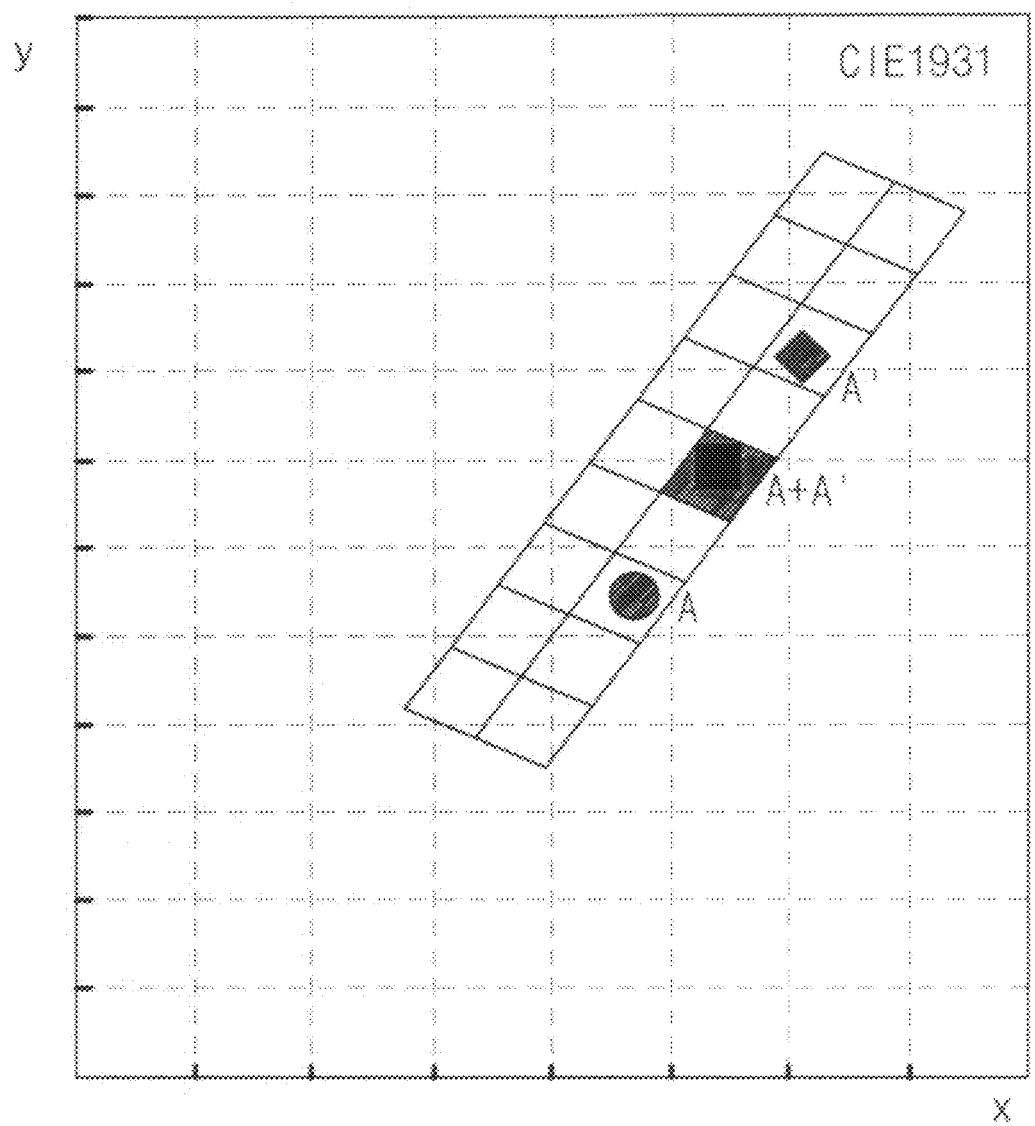
FIG. 6 is the CIE coordinates illustrating the mixing of complementary white light according to an embodiment of the present invention.

FIG. 6 is the CIE coordinates illustrating the mixing of complementary white light according to the embodiment of an present invention.

Referring to FIG. 6, a first white LED emits a first white light A belonging to a first color bin, and a second white LED emits a second white light A' belonging to a second color bin. The first and second white lights A and A' are complementary to each other with respect to a target white light. Accordingly, the first and second white lights A and A' are mixed with and complemented to each other, and the mixed white light A+A' is thus produced in the target color bin. In other words, when white light belonging to complementary color bins with respect to the target color bin are mixed, the mixed white color belonging to the target color bin may be produced.

Figure 7:
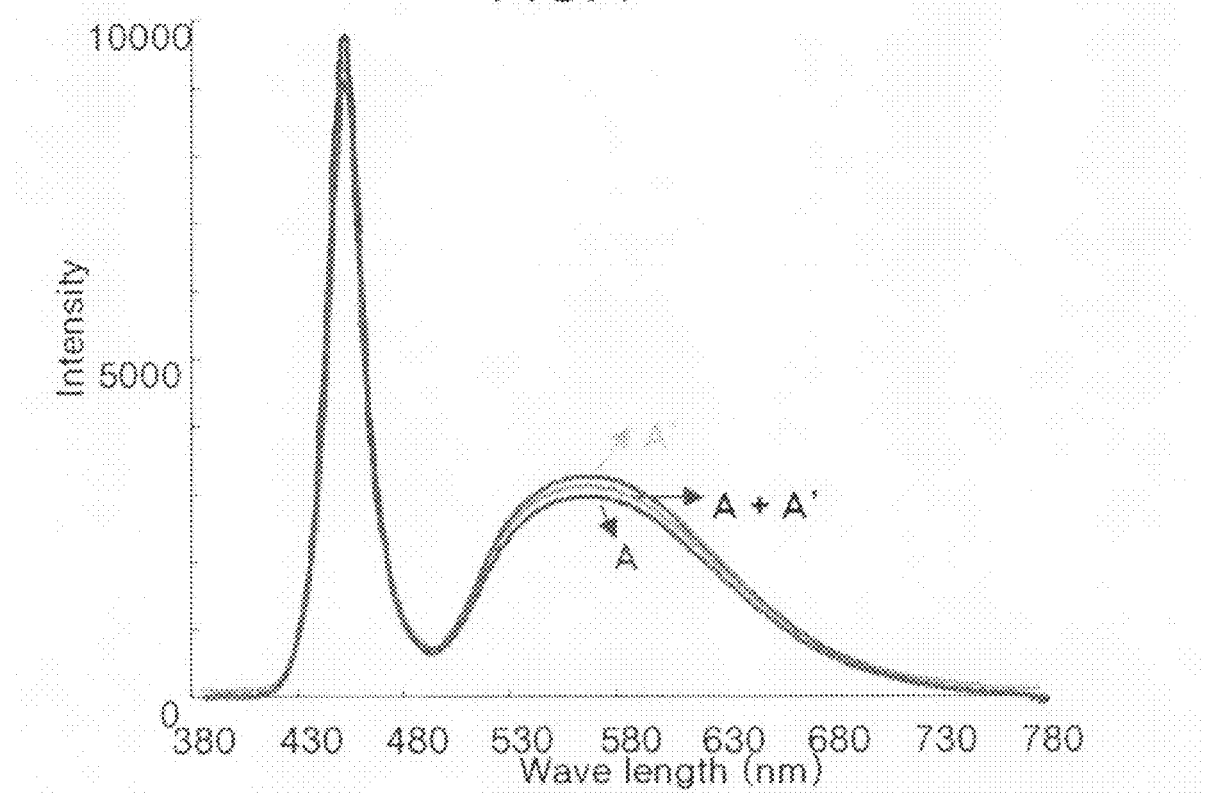
FIG. 7 is a spectrum illustrating the first white light, the second white light and the mixed white light of FIG. 6.

FIG. 7 is a spectrum illustrating the first white light, the second white light and the mixed white light of FIG. 6. Referring to FIG. 7, the mixed white light A+A' has a color property in the middle of a color property of the first white light A and a color property of the second white light A'.

Figure 8:
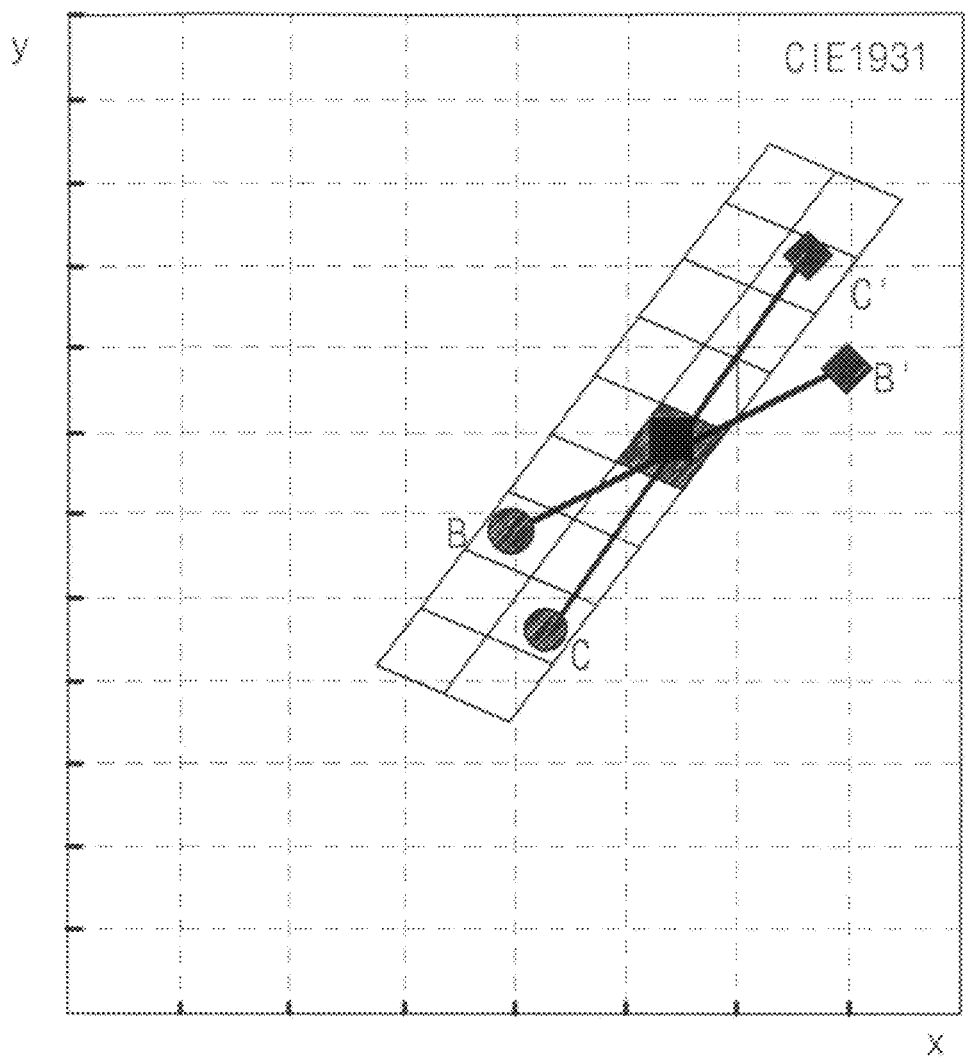
FIG. 8 is the CIE color coordinates illustrating various combinations of complementary white lights according to the embodiment of the present invention.

FIG. 8 is CIE color coordinates illustrating various combinations of complementary white light according to the embodiment of the present invention.

Referring to FIG. 8, various combinations of complementary white lights may be used for the LCD device. For example, a combination of complementary third and fourth white lights B and B' or fifth and sixth white lights C and C' having an alternate arrangement can be used to substantially produce a target white light.

As described above, various combinations of the complementary white lights may be used to produce the target white light by mixing the complementary white lights. Accordingly, even though some white LEDs among white LEDs manufactured emit the desired target white light, by appropriately combining other complementary white LEDs, most of the white LEDs may be effectively utilized for the LCD device. Therefore, production efficiency of the white LEDs may be greatly increased, and production cost of the white LEDs may be greatly reduced. Therefore, production cost of the backlight unit and the LCD device may be greatly reduced along with uniformly producing the desired target white lights.

A color property of the white light produced by mixing the complementary white lights may be recognized in advance by using color coordinates of the XYZ tristimulus.

For example, the first white light (A of FIG. 6) of the first white LED has XYZ tristimulus values as follows:

$$X_A = (x_A/y_A) \times Y_A,$$

$$Y_A, \text{ and}$$

$$Z_A = ((1 - x_A - y_A)/y_A) \times Y_A.$$

The second white light (A' of FIG. 6) of the second white LED has XYZ tristimulus values as follows:

$$X_{A'} = (x_{A'}/y_{A'}) \times Y_{A'},$$

$$Y_{A'}, \text{ and}$$

$$Z_{A'} = ((1 - x_{A'} - y_{A'})/y_{A'}) \times Y_{A'}.$$

(The $x_A$, $y_A$, $x_{A'}$, and $y_{A'}$ are coordinate values in the CIE color coordinates of FIG. 6)

By using the aforementioned XYZ tristimulus values, the mixed white light (A+A' of FIG. 6) has XYZ tristimulus values as follows:

$$X_{A+A'} = (X_A + X_{A'})/2,$$

$$Y_{A+A'} = (Y_A + Y_{A'})/2, \text{ and}$$

$$Z_{A+A'} = ((Z_A + Z_{A'})/2.$$

Accordingly, the mixed white light (A+A' of FIG. 6) has coordinate values in the CIE color coordinates of FIG. 6 as follows:

$$x_{A+A'} = X_{A+A'}/(X_{A+A'} + Y_{A+A'} + Z_{A+A'}), \text{ and}$$

$$y_{A+A'} = Y_{A+A'}/(X_{A+A'} + Y_{A+A'} + Z_{A+A'}).$$

The x values of the first and second white lights may be in a range of about 0.005 to about 0.030, and the y values of the first and second white lights may be in a range of about 0.007 to about 0.050. The first and second white lights may be in a dispersion range of up to about 0.02. In other words, the color difference between the first and second white lights may be up to about 0.02.

FIG. 9 illustrates the color distribution in CIE color coordinates of white light emitted from manufactured white LEDs.

FIG. 9 shows that the white LEDs emit various colors of white light. In FIG. 9, a white region is divided into 16 color bins A0 to A7 and B0 to B7.

Table. 1 shows 7 samples from FIG. 9 of white LEDs emitting white light having different colors.

TABLE 1

|  |  | Sample 1 | Sample 2 | Sample 3 | Sample 4 | Sample 5 | Sample 6 | Sample 7 |
|---|---|---|---|---|---|---|---|---|
| Coordinate | x | 0.285 | 0.280 | 0.288 | 0.286 | 0.279 | 0.283 | 0.287 |
| (CIE) | y | 0.268 | 0.261 | 0.275 | 0.286 | 0.255 | 0.260 | 0.279 |

Table. 2 shows color of the light that results for combinations of LEDs emitting complementary white lights among the 7 sampled white LEDs of Table. 1.

TABLE 2

| Combination |  | Target white (●) Sample 1 | Mixing 1 (▲) Sample 2 Sample 3 | Mixing 2 (■) Sample 4 Sample 5 | Mixing 3 (♦) Sample 6 Sample 7 |
|---|---|---|---|---|---|
| Color | x | 0.286 | 0.286 | 0.285 | 0.287 |
|  | y | 0.270 | 0.270 | 0.272 | 0.271 |

The white light of the first to seventh sampled LEDs belong to the color bins B4, B3, B5, B2, A6, B3, A5, respectively. The first sampled LED emits the target white light belonging to the target color bin B4. A coordinate of the white light from the first sampled LED is indicated with a circle ●, coordinates of the white lights from the second and third LEDs for the first mixed pair are indicated with a triangle ▲, coordinates of the white lights from the fourth and fifth LEDs for the second mixed pair are indicated with a square ■, and coordinates of the white lights from the second and third LEDs for the third mixed pair are indicated with a diamond ♦.

Referring to Table 2, the first to third mixed pairs substantially produce white light belonging to the target color bin B4. In other words, the first to third mixed pairs substantially produce the target whites. Accordingly, by mixing the complementary white lights, white light having substantially the same color property as the target white may be produced.

Table. 3 shows utilization ratios of example LEDs manufactured for an LCD device. FIG. 10 shows the CIE coordinates illustrating the utilization ratios of Table. 3. The utilization ratio is the ratio of the utilization area to total area of the white region.

TABLE 3

|  |  | Utilizing complementary white mixing | | | |
|---|---|---|---|---|---|
|  |  | First utilization region (B3B5) | Second utilization region (A6B2) | Third utilization region (A5B3) | Utilizing target bin (no color mixing) |
| Color difference between color bins | Δx | 0.008 | 0.006 | 0.002 | 0.000 |
|  | Δy | 0.014 | 0.032 | 0.017 | 0.000 |
| Maximum color difference | Δx | 0.015 | 0.032 | 0.021 | 0.007 |
|  | Δy | 0.023 | 0.042 | 0.026 | 0.009 |
| Utilization ratio | (%) | 13% | 83% | 38% | 4.0% |

In Table. 3 and FIG. 10, the first utilization region is defined by the color bins B3, B4, and B5, of which bins B3 and B5 are complementary bins for the first mixing of Table. 2, as opposite corner regions of the first utilization region. The second utilization region is defined by the 10 color bins A2 through A6 and B2 through B6, of which bins A6 and B2 are complementary bins for the second mixing of Table. 2, as opposite corners of the second utilization region. The third utilization region is defined by 6 color bins, A3 through A5 and B3 through B5, which the color bins A5 and B3 are complementary bins for the third mixing of Table. 2, as opposite corners of the third utilization region. The color difference between the color bins of Table. 3 is the color difference between the centers of the color bins at the corner regions of each of the first to third utilization regions, for example, between the centers of B3 and B5, between the centers of A6 and B2, and between the centers A5 and B3. The maximum color difference of Table. 3 is a difference between the white colors at the opposite or furthest corners i.e., the opposite vertexes of each of the first to third utilization regions.

Referring to Table. 3 and FIG. 10, it is shown that the utilization ratios in utilizing the complementary color mixings are much greater than that utilizing the target color bin. Accordingly, among the white LEDs manufactured, many more may be utilized for the LCD device even though they do not emit the target white light. Accordingly, production efficiency of the white LEDs may increase, and production cost of the LEDs may be reduced. Therefore, production cost of the LCD device may be also reduced.

Table. 4 shows optical properties of white lights emitted from LCD devices utilizing the white mixings of Table. 2 and a white light emitted from an LCD device utilizing the target bin of Table. 2.

TABLE 4

|  |  | Utilizing target bin | Utilizing complementary white mixing | | |
|---|---|---|---|---|---|
|  |  |  | Mixing 1 | Mixing 2 | Mixing 3 |
| Luminance | nit | 311 | 302 | 324 | 303 |
| White light | x | 0.301 | 0.301 | 0.296 | 0.299 |
|  | y | 0.323 | 0.324 | 0.322 | 0.322 |
| Color reproduction range (CIE 1931, NTSC) |  | 49.9% | 49.8% | 49.1% | 49.5% |

In Table. 4, optical properties of the white lights may include a luminance, a color, and a color reproduction range.

Referring to Table. 4, the optical property of the LCD device utilizing the target bin are substantially the same as those of the LCD devices utilizing the white mixings. Accordingly, the white mixing may be effectively utilized for the LCD device.

In the embodiment as described above, mixing the white light from while LEDs having complementary colors with respect to the target white light is described. However, it should be understood that the present invention may be applied to mixing white lights complementary in other properties with respect to the target white light. For example, white LEDs emitting white lights complementary in luminance with respect to the target white light are alternately arranged to substantially produce a white light substantially having the same luminance as the target white light. Accordingly, white LEDs emitting complementary white lights in at least one of the optical properties with respect to the target white light can be utilized in the LCD device.

Further, the embodiment may be applied to utilizing various color LEDs, such as red LEDs, blue LEDs and green LEDs. For example, the embodiment may be applied to utilizing red LEDs emitting red light complementary to each other with respect to a target red light to substantially produce a red light being the same as the target red light.

Further, in the present invention, the alternate arrangement of the first and second LEDs emitting complementary lights with respect to the target light is described. In addition, an LED emitting the target light may be in the alternate arrangement at least once. For example, the LED emitting the target light may be between a first alternate arrangement of the first and second LEDs, and in a second alternate arrangement of the first and second LEDs. Alternatively, the LED emitting the target light may be outside of the alternate arrangement.

Further, the present invention may be applied to an LCD device including a direct type backlight unit. The direct type backlight unit supplies light below the liquid crystal panel. Accordingly, a plurality of LEDs may be arranged below the optical sheets. For example, a plurality of LED arrays are arranged in parallel to one another, and each LED array includes a plurality of LEDs arranged in a direction. Accordingly, each LED array may include the first and second LEDs emitting complementary lights in a similar manner as described in the embodiment. In using the direct type backlight unit, the light guide plate may be eliminated. Further the plurality of LEDs may be arranged in a matrix. In this case, the first and second LEDs may alternate in just on direction or both directions.

Further, either the manufacturer of the LEDs or the manufacturer of the LCD may define the bins used to divide the LEDs based upon color. Once the bins are determined, each LED may be tested, by either the manufacturer of the LEDs or the manufacturer of the LCD, to identify which bin each LED corresponds to. At this point each LED may be labeled indicate the bin to which it belongs or this information otherwise recorded for future use. Also, the LEDs may be physically separated according to bin for later use. Then when the LCD manufacturer selects LEDs to use in the LCD backlight, complementary LEDs may be selected from the physical bins or based upon the bin identification information on the LED or stored elsewhere.

The size and the number of the bins affects the cost, complexity, color accuracy, and LED utilization of the LCD. A larger number of smaller bins allows for better color accuracy and better utilization of the LEDs, but as the expense of additional cost and complexity of the manufacturing process. A smaller number of larger bins allows for lower cost and complexity, but at the expense of lower color accuracy and lower utilization of the LEDs. Therefore, LCD manufacturer trades off these issues to achieve the desired result.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
    a plurality of different combinations of white light emitting diodes (LEDs) arranged in a matrix, the plurality of different combinations of white LEDs each including a pair of LEDs where each LED in the pair are complementary in color to an other LED in the pair with respect to a target white light;
    a white LED emitting the target white light; and
    a plurality of optical sheets in a path from the plurality of different combinations of LEDs to a liquid crystal panel,
    wherein when a white light from each LED from the pair of LEDs are combined, the combined white light has a color substantially the same as the target white light,
    wherein the white LED emitting the target white light is between a first alternate arrangement of the plurality of different combinations of white LEDs and a second alternate arrangement of the plurality of different combinations of white LEDs.

2. The backlight unit according to claim 1, wherein the plurality of different combinations of LEDs are mounted on a printed circuit board (PCB).

3. The backlight unit according to claim 1, wherein each of a CIE color x coordinate difference and a CIE color y coordinate difference between the light from one LED in the pair of LEDs and the light from the other LED in the pair of LEDs is in a range of about 0 to about 0.02.

4. The backlight unit according to claim 1, wherein each of the pair of LEDs includes a blue LED chip and one of a yellow phosphor and a green and red mixed phosphor.

5. The backlight unit according to claim 1, further comprising a light guide plate, the plurality of different combinations of LEDs facing a side of the light guide plate.

6. The backlight unit according to claim 1, wherein the plurality of different combinations of LEDs are below the plurality of optical sheets.

7. A liquid crystal display device, comprising:
    a liquid crystal panel;
    a plurality of different combinations of white light emitting diodes (LEDs) arranged in a matrix, the plurality of different combinations of white LEDs each including a pair of LEDs where each LED in the pair are complementary in color to an other LED in the pair with respect to a target white light;
    a white LED emitting the target white light; and
    a plurality of optical sheets in a path from the plurality of different combinations of LEDs to a liquid crystal panel,
    wherein when a white light from each LED from the pair of LEDs are combined, the combined white light has a color substantially the same as the target white light,
    wherein the white LED emitting the target white light is between a first alternate arrangement of the plurality of different combinations of white LEDs and a second alternate arrangement of the plurality of different combinations of white LEDs.

8. The device according to claim 7, wherein the plurality of different combinations of LEDs are mounted on a printed circuit board (PCB).

9. The device according to claim 7, wherein each of a CIE color x coordinate difference and a CIE color y coordinate difference between the light from one LED in the pair of LEDs and the light from the other LED in the pair of LEDs is in a range of about 0 to about 0.02.

10. The device according to claim 7, wherein each of the pair of LEDs includes a blue LED chip and one of a yellow phosphor and a green-red mixed phosphor.

11. The device according to claim 7, further comprising a light guide plate, the plurality of different combinations of LEDs facing a side of the light guide plate.

12. The device according to claim 7, wherein the plurality of different combinations of LEDs are below the plurality of optical sheets.

* * * * *